United States Patent [19]

Noestheden

[11] Patent Number: 5,220,996
[45] Date of Patent: Jun. 22, 1993

[54] CONVEYOR SYSTEM

[75] Inventor: Andrew Noestheden, Tecumseh, Canada

[73] Assignee: Valiant Machine & Tool Inc., Windsor, Canada

[21] Appl. No.: 874,507

[22] Filed: Apr. 27, 1992

[51] Int. Cl.⁵ .............................................. B65G 29/00
[52] U.S. Cl. ........................... 198/465.1; 198/803.2
[58] Field of Search .............. 198/803.1, 803.2, 465.1, 198/465.3, 795

[56] References Cited

U.S. PATENT DOCUMENTS

| | | | |
|---|---|---|---|
| 3,057,456 | 10/1962 | Heinzer | 198/465.1 |
| 3,338,382 | 8/1967 | Fogg | 198/803.01 X |
| 4,461,216 | 7/1984 | Carney | 198/465.1 X |
| 4,502,585 | 3/1985 | Sticht | 198/465.1 X |
| 4,667,804 | 5/1987 | Dubuit et al. | 198/465.1 X |
| 4,751,998 | 6/1988 | Yano | 198/465.1 |
| 4,930,623 | 6/1990 | Johnson et al. | 198/465.1 |
| 4,934,515 | 6/1990 | Linden | 198/803.2 |
| 5,046,598 | 9/1991 | Colamussi | 198/465.1 |

FOREIGN PATENT DOCUMENTS

| | | | |
|---|---|---|---|
| 0644468 | 6/1964 | Belgium | 198/465.1 |
| 0276409 | 8/1988 | European Pat. Off. | 198/465.1 |
| 3029620 | 3/1982 | Fed. Rep. of Germany | 198/803.2 |
| 0011581 | 1/1977 | Japan | 198/465.1 |

Primary Examiner—Robert P. Olszewski
Assistant Examiner—James R. Bidwell
Attorney, Agent, or Firm—Gifford, Groh, Sprinkle, Patmore and Anderson

[57] ABSTRACT

A conveyor system is disclosed for transporting workpieces. The conveyor system includes an elongated frame having an inlet end and an outlet end. A pair of sprockets are rotatably mounted to both the inlet end and outlet end while a pair of closed loop chains are mounted around the sprockets so that the chains are spaced apart and parallel to each other along the frame. A motor rotatably drives the sprockets and thus the chains along the frame. A plurality of pallets, each adapted to support a workpiece, are slidably mounted to the chains by rollers so that the pallets can move longitudinally with respect to the chains. A cam is secured to the sprockets at both the inlet and outlet ends of the conveyor frame. These cams engage a cam follower on the pallet to raise the pallets from a lower section of the chain to an upper section at the inlet end of the conveyor frame and vice versa at the outlet end of the conveyor frame.

16 Claims, 5 Drawing Sheets

CONVEYOR SYSTEM

BACKGROUND OF THE INVENTION

I. Field of the Invention

The present invention relates generally to conveyor systems and, more particularly, to an accumulating conveyor system.

II. Description of the Prior Art

There are many previously known conveyor systems for transporting parts along an elongated conveyor frame. Many of these conveyors systems, furthermore, are known as accumulating conveyor systems in which the workpieces transported by the conveyor system can remain stationary despite continued operation of the conveyor system. Furthermore, many of these previously known conveyor systems utilize pallets mounted to the conveyor system for transporting the parts.

These previously known conveyor systems, however, have suffered from a number of disadvantages. These previously known accumulating conveyor systems often utilize pallets to transport workpieces from the inlet end of the conveyor frame and to the outlet end of the conveyor frame. After the workpiece has been transported to the outlet end and removed from its pallet, the pallet must be returned to the inlet end of the conveyor system whereupon the process is repeated.

These previously known conveyor systems have utilized complicated mechanisms for returning the workpiece carrying pallet to the inlet end of the conveyor system. Because of the complexity of such systems, these previously known conveyor systems have been known to jam, break down, and are subject to excessive wear of the parts. Such excessive wear necessitates frequent maintenance and/or replacement of the entire conveyor system.

SUMMARY OF THE PRESENT INVENTION

The present invention provides a conveyor system which overcomes all of the above mentioned disadvantages of the previously known systems.

In brief, the conveyor system of the present invention comprises an elongated frame having a pair of sprockets mounted at both its inlet end and its outlet end. A pair of closed loop chains are mounted to the sprockets so that the chains are spaced apart and parallel to each other. In doing so, the chains form an upper conveyor section extending from the inlet end of the conveyor frame to the outlet end, and a lower conveyor section extending beneath the upper section.

A motor is then employed to rotatably drive the conveyor chains so that the upper section of the conveyor chains moves from the inlet end of the conveyor frame towards the outlet end while the lower section of the conveyor chains moves in the opposite direction.

At least one, and preferably several pallets are slidably mounted by rollers to the chains so that the pallets can remain stationary despite continued longitudinal movement of the chains. Each pallet includes means for supporting a workpiece above the pallets.

In order to lower the pallets from the upper section of the chain to the lower section at the outlet end of the conveyor frame, and vice versa at the inlet end of the conveyor frame, each pallet includes a cam follower. This cam follower cooperates with a cam mounted to each set of sprockets so that, when the cam follower enters into the cam, the cam and cam follower move in unison with each other. Thus, at the inlet end of the conveyor, the cooperation between the cam and cam follower engages the pallet and raises the pallet from the lower section of the chain to the upper section. Similarly, at the outlet end of the conveyor frame, the cooperation between the cam follower and the cam lowers the pallet from the upper section of chain to the lower section for return to the inlet end of the conveyor frame.

In the preferred embodiment of the invention, each cam comprises a disk having a cut out while the cam follower comprises a roller which registers with and is received within the disk cut out. A stop member on each pallet abuts against the disk, until the stop member registers with the cut out, to synchronize the cam followers on the pallets with the receiving cut outs on the cams.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
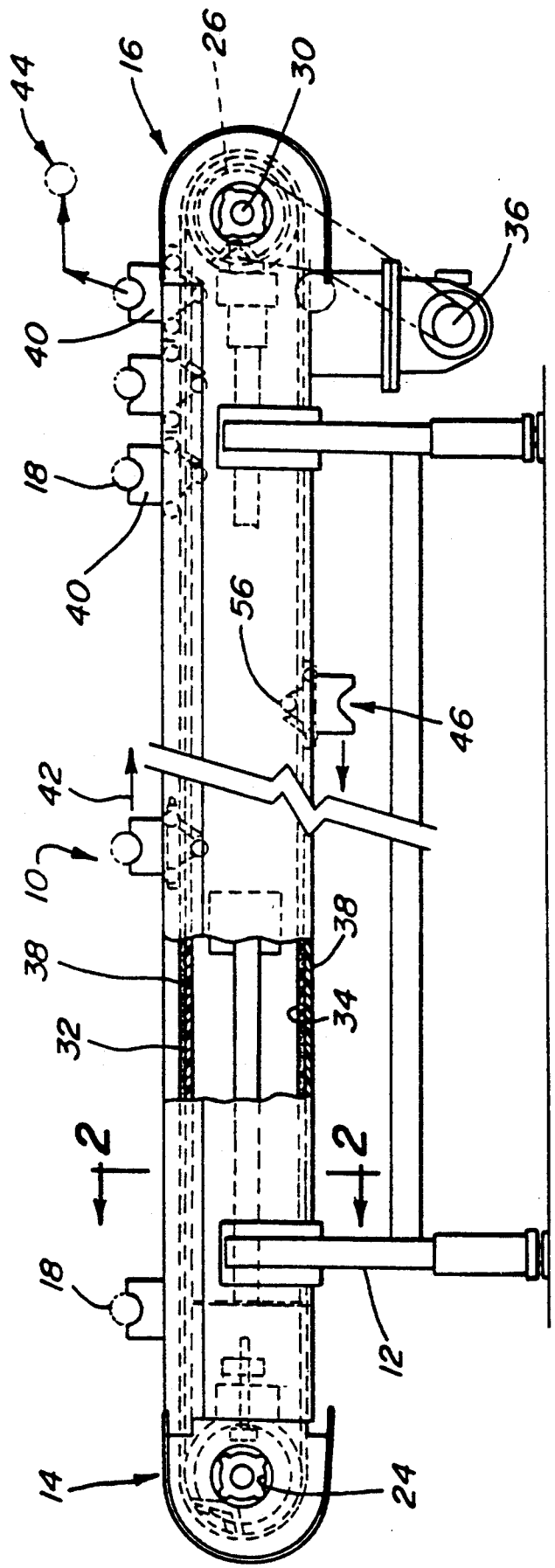
FIG. 1 is a side view illustrating a preferred embodiment of the present invention.
Figure 2:
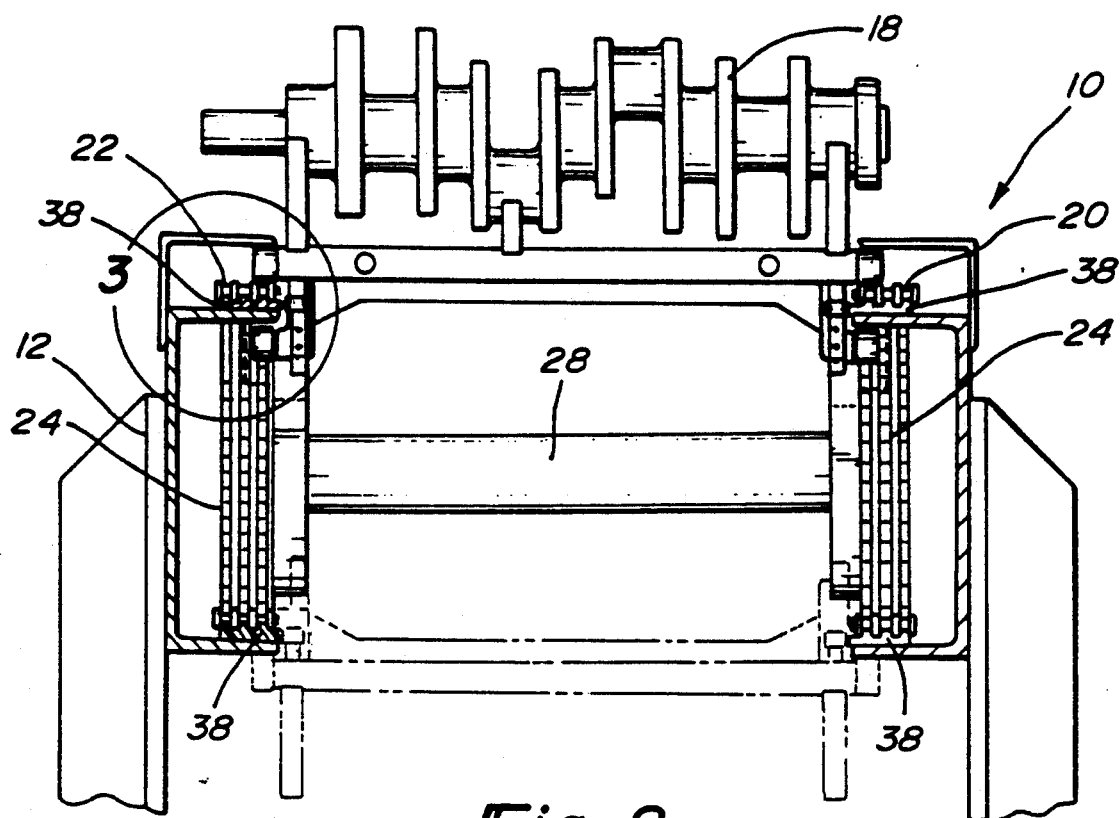
FIG. 2 is a section view taken substantially along line 2—2 in FIG. 1 and enlarged for clarity.
Figure 3:
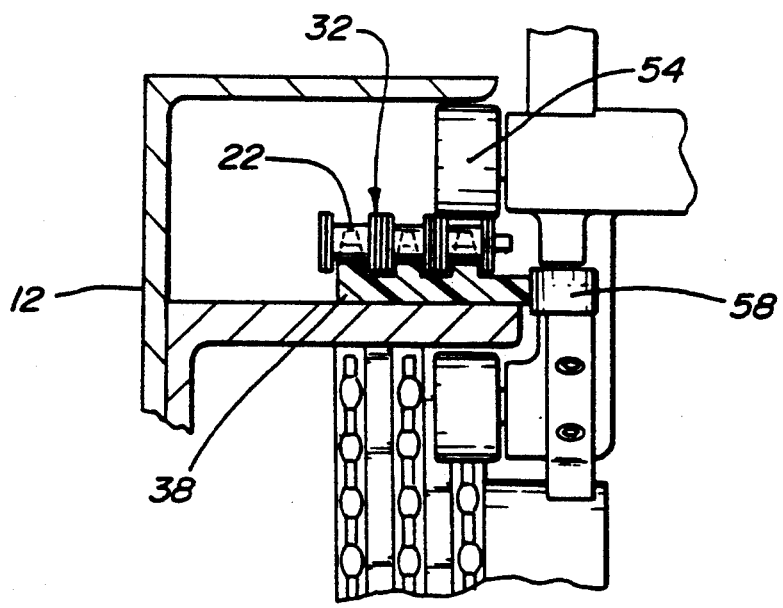
FIG. 3 is a view of circle 3—3 in FIG. 2 and enlarged for clarity.

With reference first to FIGS. 1-3, a preferred embodiment of the conveyor system 10 of the present invention is thereshown and comprises an elongated frame 12 having an inlet end 14 and an outlet end 16. In a manner which will be subsequently described in greater detail, the conveyor system 10 transports parts or workpieces 18 from the inlet end 14 and to the outlet end 16 of the frame 12.

A pair of closed loop chains 20 and 22 (FIG. 2) are rotatably mounted by sprockets 24 to the inlet end 14 and by sprockets 26 (FIG. 1) to the outlet end 16 of the frame 12. The inlet sprockets 24 are mounted to a common axle 28 (FIG. 2) while similarly, the outlet sprockets 26 are mounted to a common axle 30 (FIG. 1) so that the sprockets 24 and 30 all rotate in unison with each other. Furthermore, as best shown in FIG. 2, the chains 20 and 22 are spaced apart and generally parallel to each other. As best shown in FIG. 1, the chains 20 and 22 are each a closed loop thus forming an upper conveyor section 32 and a lower conveyor section 34.

Referring now to FIG. 1, a motor 36 is used to rotatably drive the sprockets 26. Thus, in doing so, the sprockets 26 drive the chains 20 and 22 in unison with each other so that the upper conveyor section 32 moves from the inlet end 14 of the frame 12 towards the outlet end 16 while, conversely, the lower conveyor section 34 moves from the outlet end 16 of the frame 12 towards the inlet end 14.

Referring again to FIGS. 1-3, in order to support the chains 20 and 22 between the ends 14 and 16 of the frame 12, a slide block 38 is mounted between a portion of the frame 12 and each chain 20 and 22 along the entire length of both the upper section 32 and the lower section 34. Preferably, the slide blocks 38 are an oil impregnated synthetic material so that friction is minimized between the chains 20 and 22 and the frame 12.

As shown in FIG. 1, the conveyor system 10 includes at least one, and preferably a plurality, of pallets 40 for transporting the workpieces 18 from the inlet end 14 and to the outlet end 16 of the frame 12 as depicted by arrow 42. After reaching the outlet 16 of the frame 12, and the workpiece 18 removed from the pallet 40, as depicted at 44, the pallets 40 are returned to the inlet end 14 along the lower conveyor section 34.

Figure 4:
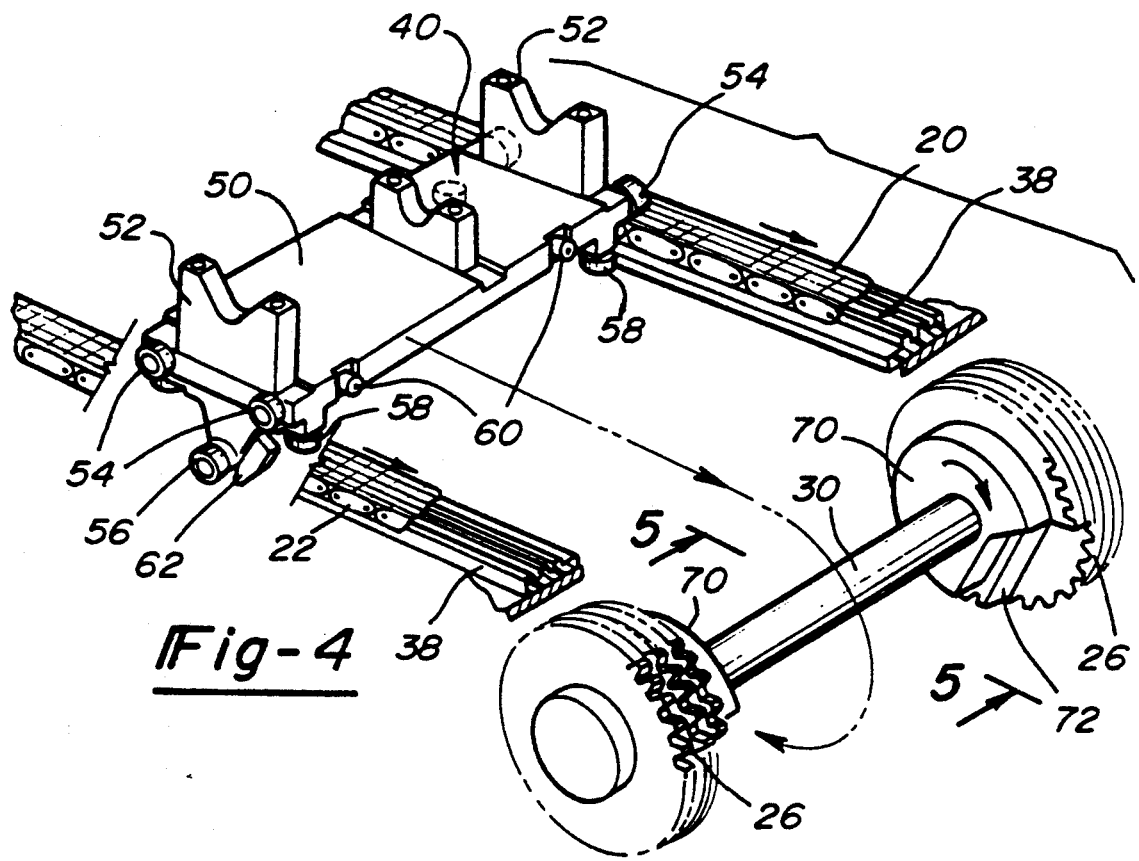
FIG. 4 is an exploded fragmentary view illustrating the operation of the preferred embodiment of the invention.

With reference now especially to FIG. 4, the pallet 40 is thereshown in greater detail and comprises a base 50 having work support members 52 extending upwardly from the upper side of the base 50. These members 52 are specially fabricated to support the particular workpiece 18 (illustrated in FIG. 2 as a crankshaft), although other parts can, of course, be transported.

Referring now especially to FIGS. 3 and 4, a pair of upper rollers 54 are provided along each lateral side of the pallet base 50. These rollers 54, as best shown in FIG. 3, engage the top of the chains 20 and 22 along the upper conveyor section 32 of the chains. The rollers 54 are preferably ball bearing rollers so that the rollers 54 slidably mount the pallet 40 to the chains 20 and 22. Thus, the pallet 40 can remain stationary despite continued movement of the chains 20 and 22 therefore permitting accumulation of the pallets 40 along the conveyor system 10.

Referring now to FIGS. 1 and 4, a lower roller 56 is also rotatably mounted to each lateral side of the pallet base 50. This lower roller 56 is positioned below the chains 20 and 22 along the upper section 32 of the chain (FIG. 3). However, when the pallets 40 are inverted, as shown at 46 in FIG. 1, for their return from the outlet end 16 to the inlet end 14 of the frame 12, the lower rollers 56 support the pallet 40 along the top of the chains 22 and 24 along the lower conveyor section 34. Thus, relative movement of the pallets 40 with respect to the chains is accomplished both along the upper conveyor section 32 and lower conveyor section 34 thus permitting the pallets 40 to accumulate along both chain sections 32 and 34.

Referring again to FIGS. 3 and 4, a plurality of guide rollers 58 are also rotatably mounted to the pallet along an axis perpendicular to the longitudinal axis of the chains 20 and 22. These guide rollers 58 can abut against the opposite sides of the frame 12, or slide blocks 38 (FIG. 3) to minimize friction between the pallets 40 and the sides of the frame 12.

As shown in FIG. 4, the pallets preferably include one or more bumpers 60 which cushion any impact between adjacent pallets 40.

A stop member 62 is also attached to each lateral side of the pallet 40. The operation and purpose of the stop block will be described below.

The operation of moving the pallets 40 between the upper section 32 and lower section 34 of the chains will now be described for lowering the pallets 40 from the upper conveyor section 32 to the lower conveyor section 34 at the outlet end 16 of the conveyor frame 12. It will be understood, however, that a like description shall also apply for raising the pallets 40 from the lower section 34 to the upper section 32 at the inlet end 14 of the conveyor frame 12.

Figure 5:
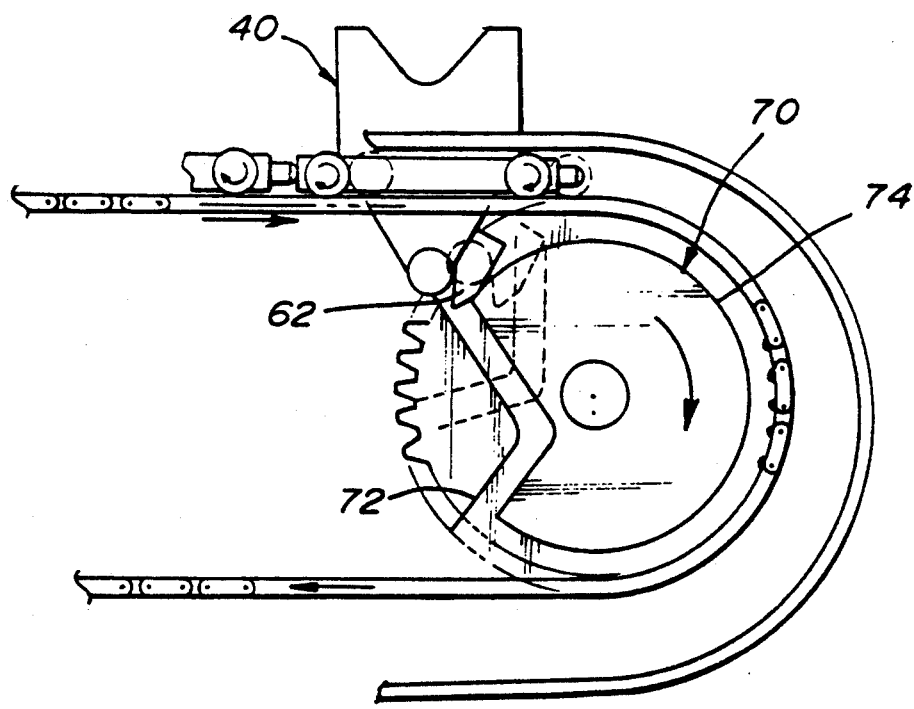
FIG. 5 is a view taken substantially along arrow 5—5 in FIG. 4.

With reference then to FIGS. 4 and 5, a cam 70 is mounted adjacent each sprocket 26 at the outlet end 16 of the conveyor frame. These cams 70 are generally disk shaped but include a generally V-shaped cut out 72. The cut outs 72 face each other and the cams 70 are secured to the sprockets 26 so that the cams 70 together with their cut outs 72 rotate in unison with the sprockets 26.

With reference now especially to FIG. 5, as the pallet 40 approaches the cam 72, the stop member 62 on the pallet 40 registers with an outer periphery 74 of the cam 70. Thus, with the stop member 62 in abutment with the outer periphery 74 of the cam 70, the stop member 62 holds the pallet 40 stationary until the stop member 62 registers with the cut out 72. When this occurs, the stop member 62 moves into the cut out as shown in FIG. 6.

Figure 6:
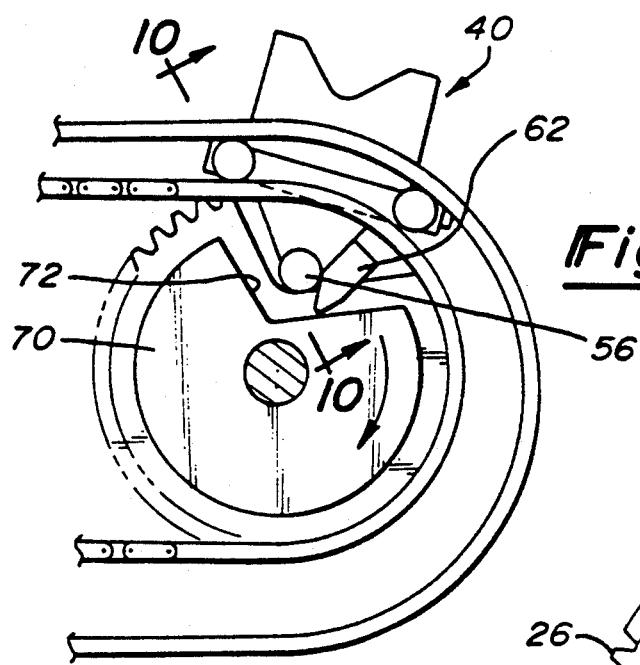
FIGS. 6–9 are diagrammatic views similar to FIG. 5 and illustrating the operation of the present invention.

With reference then to FIG. 6, as the stop member registers with the cam cut out 72, both the stop member 62, together with the lower roller 56 moves into the cam cut out 72. The lower roller 56 on the pallet forms a cam follower for the cam 70.

Figure 7:
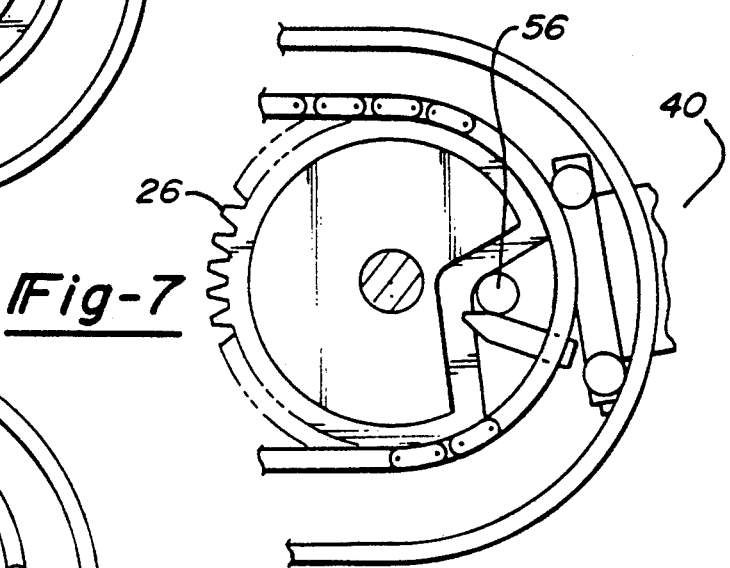
Figure 8:
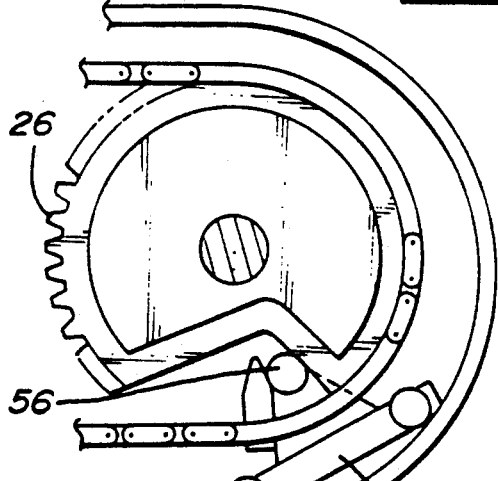
Figure 9:
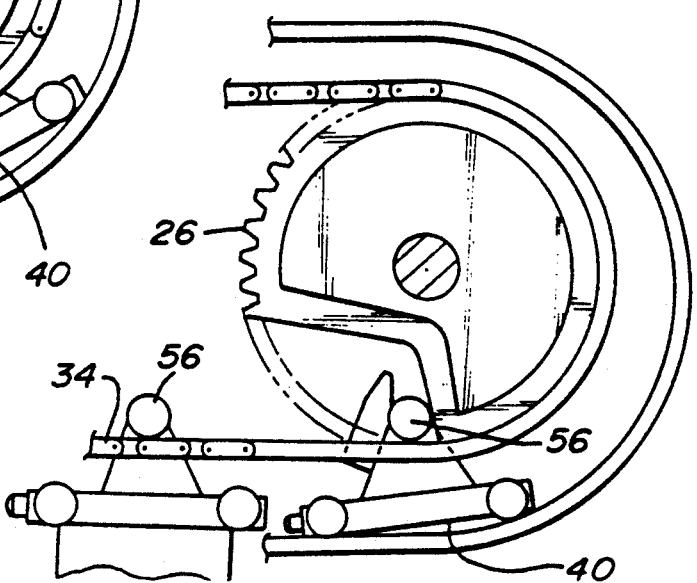

With reference now to FIGS. 7-9, with the roller or cam follower 56 positioned in the cam cut out 72, the continued rotation of the sprocket 26 rotatably drives the roller 56, together with its attached pallet 40 from the upper position, illustrated in FIG. 6, through the position shown sequentially in FIGS. 7 and 8 and to the lower position as shown in FIG. 9. Furthermore, as shown in FIG. 9, in its lower position the sprocket 26 releases the cam follower or roller 56 to the lower conveyor section 34. The pallet 40 is then transported back to the inlet end 14 of the frame 12 due to the friction between the roller 56 and the chains 20 and 22. However, as previously described, the pallets 40 can accumulate along the lower chain section 34 which simply results in rotation of the rollers 56 with respect to their respective chains 20 and 22.

Figure 10:
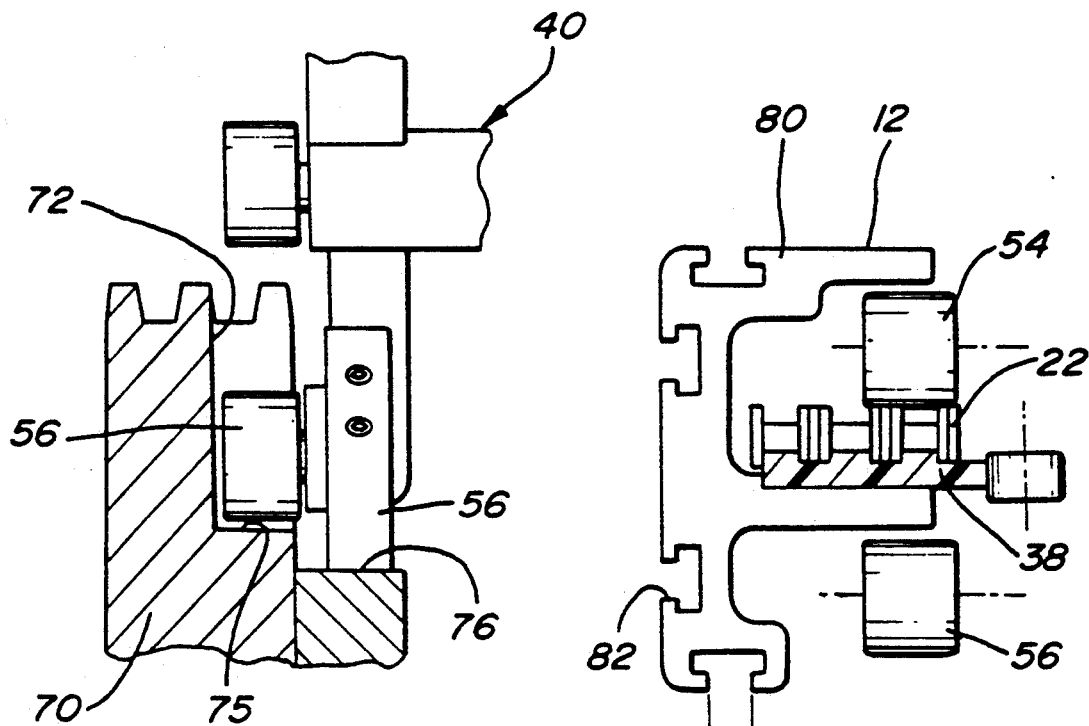
FIG. 10 is a view taken along arrow 10—10 in FIG. 6.

As best shown in FIGS. 6 and 10, the cam cut out 72 has a stepped construction with the outermost step 75 engaging the cam follower or roller 56 and the innermost step 76 in registration with the stop member 56. This step construction minimizes rubbing between the stop member 56 and the cam 70 during operation of the conveyor system 10.

Substantially identical cams are secured to the sprockets 24 at the inlet end 14 of the conveyor frame 12. Thus, the operation of these cams, together with the cam followers or rollers 56, is substantially identical to that depicted in FIGS. 5-6, in an inverted position. Therefore, a further description is unnecessary.

Figure 11:
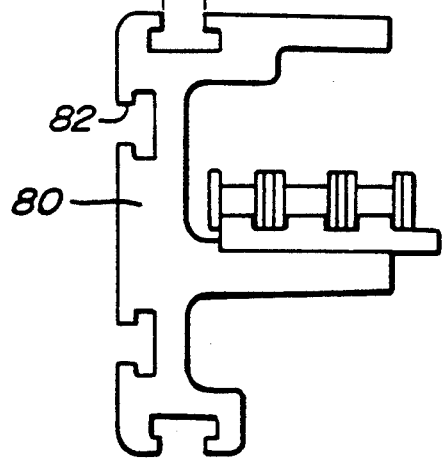
FIG. 11 is a cross sectional view illustrating one side of the conveyor frame and illustrating a modification thereof.

With reference now to FIG. 11, an alternate, and indeed preferred, construction of the frame is thereshown in cross section. Preferably, each side of the frame 12 is constructed from two F-shaped extrusions 80 for inexpensive and yet durable construction. The extrusions 80 may also include one or more T-slots 82 for attachment of machining fixtures, gauges or the like.

In operation of the conveyor system, the chains 20 and 22 are continuously driven by the motor 36. Workpieces are loaded onto the pallets 40 adjacent the inlet end of the conveyor frame 12 and are unloaded by conventional means at the outlet end 16 of the conveyor frame 12. As previously described, the pallets 40 are continuously recirculated between the inlet and outlet ends 14 and 16 of the frame 12.

Although each of the pallets 40 is slidably mounted to the chains 20 and 22 by the rollers 54 and 56, the friction between the rollers 54 and 56 and the chains 22 and 24, together with internal friction of the rollers 56 causes the pallets 40 to move in synchronism with the chains 22 and 24. However, the pallets 40 can accumulate, i.e. remain stationary, along either the upper section 32 or lower section 34 of the chains 22 and 24 when necessary whereupon the rollers 54 or 56 rotate and allow relative movement between the pallets 40 and the chains 20 and 22.

Furthermore, although the present invention has been described simply for moving parts from the inlet end 14 and to the outlet end 16 of the conveyor, machining operations on the workpieces 18 along the conveyor system 10 are, of course, possible. In such a situation, the pallet 40 would be locked at a predetermined position along the conveyor system, e.g. by raising the pallet 40 into a fixture at a predetermined position along the conveyor system. When raised into the fixture, the pallet would remain stationary at a predetermined location whereupon machining operations are possible.

From the foregoing, it can be seen that the present invention provides a conveyor system that is highly effective in operation and yet exhibits only minimal wear and tear on the moving systems of the conveyor. Having described my invention, however, many modifications thereto will become apparent to those skilled in the art to which it pertains without deviation from the spirit of the invention as defined by the scope of the appended claims.

I claim:

1. A conveyor system for transporting workpieces comprising
   an elongated frame having an inlet end and an outlet end,
   an endless member forming a closed loop,
   means for rotatably mounting said endless member to said inlet and said outlet ends of said frame so that said endless member forms both an upper and a lower section extending between said ends of said frame,
   means for driving said endless member so that said upper section moves from said inlet end towards said outlet end and so that said lower section simultaneously moves from said outlet end towards said inlet end,
   at least one pallet adapted to support the workpiece,
   means for slidably mounting said pallet to said endless member so that said pallet can move relative to said endless member,
   means at said inlet end of said frame for lifting said pallet from said lower section to said upper section of said endless member, and
   means at said outlet end of said frame for lowering said pallet from said upper section to said lower section of said endless member,
   wherein said means for slidably mounting said pallet to said endless member comprises at least an upper roller and a lower roller, said rollers being rotatably mounted to said pallet, said rollers being positioned on opposite sides of said endless member.

2. The invention as defined in claim 1 wherein said pallet includes a cam follower and wherein said lifting means comprises a cam attached to said rotatable mounting means at said inlet end of said frame, said cam engaging said cam follower and elevating said pallet from said lower section to said upper section during rotation of said rotatable mounting means.

3. The invention as defined in claim 2 wherein said cam comprises a disk coaxially secured to said rotatable mounting means, said disk having a cut out, said cam follower entering into said cut out when said cam follower registers with said cut out whereupon said cam and said cam follower rotate in unison with each other.

4. The invention as defined in claim 3 and comprising a stop block on said pallet which abuts against said cam and prevents movement of said pallet until said cam follower registers with said cam.

5. The invention as defined in claim 1 wherein said pallet includes a cam follower and wherein said lowering means comprises a cam attached to said rotatable mounting means at said outlet end of said frame, said cam engaging said cam follower and lowering said pallet from said upper section to said lower section during rotation of said rotatable mounting means.

6. The invention as defined in claim 5 wherein said cam comprises a disk coaxially secured to said rotatable mounting means, said disk having a cut out, said cam follower entering into said cut out when said cam follower registers with said cut out whereupon said cam and said cam follower rotate in unison with each other.

7. The invention as defined in claim 6 and comprising a stop block on said pallet which abuts against said cam and prevents movement of said pallet until said cam follower registers with said cam cut out.

8. The invention as defined in claim 1 wherein said endless member comprises a chain and said rotatable mounting means comprises a sprocket.

9. The invention as defined in claim 8 wherein said means for moving said endless member comprises means for rotatably driving said sprocket.

10. The invention as defined in claim 1 wherein said endless member comprises a pair of chains, each forming a closed loop, said chains being spaced apart and parallel to each other.

11. The invention as defined in claim 1 wherein said rollers are spaced apart from each other by a distance greater than a thickness of said endless member so that only said upper roller engages said endless member on said upper section while only said lower roller engages said endless member on said lower section of said endless member.

12. The invention as defined in claim 11 wherein said at least one upper roller comprises a pair of longitudinally spaced rollers.

13. The invention as defined in claim 2 wherein a portion of said endless member overlies said cam.

14. The invention as defined in claim 1 and comprising means for slidably mounting said endless member to said frame between the inlet and outlet ends of said frame.

15. A conveyor system for transporting workpieces comprising
   an elongated frame having an inlet end and an outlet end,
   an endless member forming a closed loop,
   means for rotatably mounting said endless member to said inlet and said outlet ends of said frame so that said endless member forms both an upper and a lower section extending between said ends of said frame, means for driving said endless member so that said upper section moves from said inlet end towards said outlet end and so that said lower section simultaneously moves from said outlet end towards said inlet end, at least one pallet adapted to support the workpiece, means for slidably mounting said pallet to said endless member so that said pallet can move relative to said endless member, means at said inlet end of said frame for lifting said pallet from said lower section to said upper section of said endless member, and means at said outlet end of said frame for lowering said pallet from said upper section to said lower section of said endless member, wherein said pallet includes a cam follower and wherein said lifting means comprises a cam attached to said rotatable mounting means at said inlet end of said frame, said cam engaging said cam follower and elevating said pallet from said lower section to said upper section during rotation of said rotatable mounting means, wherein said cam comprises a disk coaxially secured to said rotatable mounting means, said disk having a cut out, said cam follower entering into said cut out when said cam follower registers with said cut out whereupon said cam and said cam follower rotate in unison with each other, a stop block on said pallet which abuts against said cam and prevents movement of said pallet until said cam follower registers with said cam.

16. A conveyor system for transporting workpieces comprising an elongated frame having an inlet end and an outlet end, an endless member forming a closed loop, means for rotatably mounting said endless member to said inlet and said outlet ends of said frame so that said endless member forms both an upper and a lower section extending between said ends of said frame, means for driving said endless member so that said upper section moves from said inlet end towards said outlet end and so that said lower section simultaneously moves from said outlet end towards said inlet end, at least one pallet adapted to support the workpiece, means for slidably mounting said pallet to said endless member so that said pallet can move relative to said endless member, means at said inlet end of said frame for lifting said pallet from said lower section to said upper section of said endless member, means at said outlet end of said frame for lowering said pallet from said upper section to said lower section of said endless member, wherein said pallet includes a cam follower and wherein said lowering means comprises a cam attached to said rotatable mounting means at said outlet end of said frame, said cam engaging said cam follower and lowering said pallet from said upper section to said lower section during rotation of said rotatable mounting means, wherein said cam comprises a disk coaxially secured to said rotatable mounting means, said disk having a cut out, said cam follower entering into said cut out when said cam follower registers with said cut out whereupon said cam and said cam follower rotate in unison with each other, and a stop block on said pallet which abuts against said cam and prevents movement of said pallet until said cam follower registers with said cam cut out.

* * * * *